Patented July 18, 1950

2,515,242

UNITED STATES PATENT OFFICE 2,515,242

METHOD OF MAKING THIOPHENETHIOL

Sigmund J. Lukasiewicz, Woodbury, N. J., assignor to Socony-Vacuum Oil Company, Incorporated, a corporation of New York No Drawing. Application January 10, 1947, Serial No. 721,454

7 Claims. (Cl. 260—329)

This invention relates to the preparation of a useful sulfur-containing organic compound and, more particularly, is directed to a method for making thiophenethiol. It has been discovered in accordance with the present invention that thiophenethiol can be obtained by vacuum distillation of thiophene tars which are produced by reacting certain hydrocarbons with sulfur, as hereinafter described.

Processes for preparing the thiophene tars which serve as the source of thiophenethiol obtained in accordance with the present invention are described at length in U. S. Patent 2,450,659. For convenience herein, however, the following is offered as a brief description of the thiophene tars and processes for their preparation.

Thiophene tar and thiophene are prepared by separately preheating sulfur and one or more normal aliphatic hydrocarbons selected from the group consisting of normal butane, normal butenes, and butadienes to temperatures such that combining the sulfur and the hydrocarbon material will give a mixture having a temperature in excess of about 450° C., mixing the preheated sulfur and preheated hydrocarbon mixture, maintaining the temperature of the mixture at a temperature in excess of about 450° C. for a period of time of at least 0.01 second and reducing the temperature of the mixture to less than about 450° C. Along with thiophene tar and thiophene, hydrogen sulfide and small amounts of carbon disulfide are also formed in the process.

While relatively large quantities of sulfur are employed in preparing the thiophene tars, sulfur is, nevertheless, one of the least expensive and most non-critical of chemical reagents. It has been found in the operation of this process that the relative proportions of sulfur and hydrocarbon material in the charge may be varied over wide limits. Too much sulfur, however, results in poor efficiency in sulfur utilization per pass and favors the complete sulfurization of hydrocarbon material to carbon disulfide. Yet, too low a proportion of sulfur lowers the conversion per pass and the ultimate yield by increasing the overall thermal degradation of hydrocarbon material. Generally speaking, best results are obtained using a weight ratio of sulfur to a hydrocarbon material varying between about 0.5 and about 4.0, although when butenes and butadienes constitute the bulk of the hydrocarbon charge, the lower limit of the weight ratio may be lower than 0.5. It should be observed, however, that for economical operation of the process, it is preferred not to use a hydrocarbon charge consisting predominantly of butadienes because of their tendency to polymerize under the conditions of the process.

The selectivity of the reaction involved in the process for the preparation of thiophene tars and thiophene depends primarily upon two variables; namely, the reaction temperature at which the normal aliphatic hydrocarbon or hydrocarbons are contacted with sulfur, and the reaction time or the time during which contact between the reactants is maintained at the reaction temperature.

The limits of operating temperature are fixed between the kinetics of the desired reaction and the kinetics of possible side reactions. It has been found, in this connection, that the reaction temperature may vary between about 450° C. and about 760° C. and preferably between about 540° C. and about 650° C. when butane is the predominant hydrocarbon reacting in the charge and between about 480° C. and about 590° C. when butenes and butadienes are the predominant hydrocarbon reactants in the charge. Below the lower limit of the temperature range (about 450° C.), the reaction is so slow as to require a large through-put of sulfur and a higher ratio of hydrocarbon recycle for a fixed amount of end product, thereby detracting from the economics of the operation. Above the upper limit of the temperature range, the secondary reaction of degradation of hydrocarbon material in the charge takes precedence, thereby decreasing the yield of desired product. In addition to this, high temperatures favor the formation of carbon disulfide. It must be noted, also, that at these high temperatures corrosion problems are at a maximum, corrosion increasing perceptibly with increasing temperature.

It has also been found, in connection with this process, that the optimum reaction time depends upon the temperature employed. In general, other variables remaining constant, the lower the temperature, the longer the reaction time. The reaction or contact time and the reaction temperature are somewhat fixed, one in relation to the other, by the degree of degradation of the hydrocarbon material in the charge and by the effect of formation of undesirable products which may be tolerated. Thus, too long a contact time at high temperature results in severe cracking of the hydrocarbon material in the charge. The reaction proceeds with extreme speed, the only apparent limitation being the rapidity with which heat can be supplied to the reaction mixture. The reaction is highly endothermic, requiring by experimental measure approximately 28,000 calories per gram molecular weight of thiophene produced from normal butane. The lower limit of the range of reaction time is fixed, therefore, by the engineering problem of heat transfer and by mechanical limitations such as allowable pressure drop across the reactor. Relatively long reaction times at temperatures in the neighborhood of the lower limit of the temperature range results in lower yields of thiophene and increased yields of thiophene tar. Too short a reaction time, however, at temperatures in the nighborhood of the lower limit of the temperature range results in insufficient reaction. Accordingly, it has been found that for best results the time of reaction is fixed by the reaction temperature.

In view of the foregoing, the criteria to be used in determining optimum operating temperatures within the range 450° C. to 760° C. depend on the degree of conversion desired commensurate with operating costs, such as heat input and equipment cost, bearing in mind that within limits, the shorter the reaction time, and accordingly the higher the temperature, the larger the amount of end product which can be realized from a unit of given size per day.

While the relationship between the temperature of reaction and reaction time is not peculiar to the present process, it has been found, in accordance with the present invention, that thiophene tar and thiophene may be produced by reacting sulfur and the aforesaid 4-carbon hydrocarbons at a temperature between about 450° C. and about 760° C. for a period of time selected to minimize the yields of secondary reaction products such as carbon disulfide, coke-like materials and the like at the selected temperature. Under such conditions, when operating continuously with a reactor coil of suitable size and at a practical charge rate, it has been found that the lowest practical limit of the time of reaction is of the order of 0.01 second at about 760° C. The upper practical limit of the reaction time, other variables remaining constant, will correspond to the lower limit of the reaction temperature and may be of the order of several seconds.

Separate preheating of the hydrocarbon reactant and sulfur and quenching of the reaction mixture are necessary for achieving the somewhat close control of the reaction time at a given reaction temperature. This is very important in the specific reaction products, thiophene and thiophene tars. It is suspected that a number of reactions occur upon contacting the hydrocarbon reactant and sulfur. In this connection, the following should be noted: cracking of the hydrocarbon reactant, destroying the 4-carbon atom chain structure (said 4-carbon atom chain being a prerequisite for the formation of thiophene), formation of thiophene tars high in sulfur and formation of carbon disulfide. These reactions compete one with another. It has been found that the rates of the formation of lighter hydrocarbons and of the formation of carbon disulfide are somewhat slower than those required for the formation of thiophene and thiophene tars. Accordingly, proper control of the reaction time at a given reaction temperature, achieved by separate preheating, mixing, heating at a given temperature for an increasing period of time, and quenching is necessary to produce high yields of thiophene and thiophene tars with limited yields of carbon disulfide, coke-like materials, and fixed gases, due to a limited decomposition of the hydrocarbon product. The rate of the reaction producing thiophene tars is fairly close to that required for the formation of thiophene, and the yields of thiophene tars and of thiophene are approximately the same.

In carrying out the process for preparing thiophene tars, it is essential to preheat the reactants separately. Heating the hydrocarbon material and sulfur together is undesirable in that heavy tars are produced and these are subsequently cracked in the reactor, causing undue coke formation. Tests have shown that when the reactants are heated together up to temperatures within the aforementioned reaction temperature ranges, tar formation is favored, as is subsequent cracking thereof, with the result that the reaction zone is eventually filled with a heavy carbonaceous deposit. Therefore, it is essential to preheat each of the reactants separately, that is, the hydrocarbon mixture or mixture of hydrocarbons and sulfur, to such temperatures that when they are brought together under proper conditions of flow, a temperature within the reaction temperature range is achieved before effecting contact between them. In practice, this is effected ordinarily by separately preheating each of the reactants to temperatures within the reaction temperature range.

After separately preheated hydrocarbon reactant and sulfur are mixed and allowed to react for the reaction time indicated by the operating temperature, the temperature of the reaction mixture is immediately lowered to below about 450° C., in practice appreciably below 450° C. in order to avoid over-reaction in the system after leaving the reactor. This may be achieved suitably by spraying the product leaving the reactor with a liquid.

In this process the reaction is effected preferably at atmospheric pressure or under sufficient pressure to cause the flow of the reactants through the reactor and auxiliary system under the desired reaction conditions. Tests have shown that the yield per pass and ultimate yield of thiophene decreases with increasing pressure. However, even at appreciable pressures, thiophene and thiophene tars are, nevertheless, produced in substantial amounts.

Vacuum distillation of the above described thiophene tars is a destructive distillation process in which the charge, probably disulfides, polysulfides, etc., is decomposed during the heating process into distillable liquids and hydrogen sulfide. A specific embodiment of the present invention involves destructive vacuum distillation of the original tar and subsequent vacuum fractionation of the distillate so obtained to yield two distinct fractions, a lower boiling material and a higher boiling material. It has been established, in accordance with this invention, that the lower boiling material is thiophenethiol. The higher boiling material is described more fully in copending application Serial Number 721,453, filed January 10, 1947.

During the course of the aforesaid vacuum distillation, hydrogen sulfide is evolved, giving rise to frothing and bumping of the tar. These undesirable conditions have been overcome, however, by resorting to any one of several modifications. Smoother operation is realized by locating a capillary tube in the distillation vessel so that its lower end is located below the surface of the boiling tar and directing a stream of inert gas, such as carbon dioxide, nitrogen, or the like, through the tube and thus through the boiling tar. Another means involves first evacuating the distillation vessel at room temperature to de-gas the tar therein and thereafter slowly increasing the temperature of the tar. Hydrogen sulfide evolved from the tar during the distillation is readily removed by scrubbing the evolved gases by passing through towers filled with acid-absorbing media, such as soda lime, sodium hydroxide pellets, etc. This absorption of hydrogen sulfide protects the mechanical moving parts of the pump used to obtain the desired vacuum and hence is highly desirable. However, if a steam ejector system is used to obtain vacuum, the preliminary absorbing step may be omitted, since in this case the hydrogen sulfide will be exhausted to the atmosphere.

It has been found that maximum distillation efficiency can be attained by keeping the pressure below 10 millimeters and preferably below 2 millimeters of mercury. If the pressure is permitted to rise to the order of 10 millimeters of mercury, the temperature must necessarily be increased for distillation to occur at a reasonable rate and ultimately the rate of decomposition with evolution of hydrogen sulfide becomes too rapid to maintain an appreciable vacuum. When the temperature of the initial distillation rises to the neighborhood of 250° C., the tar has a tendency to polymerize and coke. Accordingly, the temperature of the initial distillation should be maintained between about 150° C. and about 250° C. and preferably between about 175° C. and about 190° C. to attain a maximum yield of red oily distillate. Under the above specified conditions of temperature and pressure, approximately 30–50 per cent of the initial charge of thiophene tar is distillable.

Subsequent vacuum fractionation of the red oily distillate is carried out at pressures below 10 millimeters of mercury and preferably at 4 millimeters of mercury or below. Such redistillation yields two distinct fractions, a low boiling fraction (40–45° C. at 2 millimeters) constituting 60–85 per cent of the initial distillate and a high boiling fraction (120–125° C. at 2 millimeters) constituting approximately 15–40 per cent of the initial distillate.

Having described in a general way the nature of this invention, the following example will serve as an illustration without limiting the same:

Example 1

A mixture containing 30 per cent by volume of 1,3-butadiene and 70 per cent by volume of normal butane was charged into a preheater at a rate of 35 grams per minute and heated to a temperature of 590° C. Sulfur was charged to a separate preheater at a rate of 28 grams per minute and heated to a temperature of 590° C. The two streams were sent through a mixing nozzle and then through a baffled tube reactor constructed of 27 per cent chromium stainless steel, maintained at a temperature of 650° C. The reaction product was quenched with a water spray, passed through a small Cottrell precipitator to remove tar mist and scrubbed through a hot countercurrent caustic tower. Liquid product was condensed and separated in a water cooler and ice trap and the residual gas was metered. Of the hydrocarbon material charged, 49 per cent was converted to liquid product and tar. Fractionation of a portion of the liquid product after the removal of $C_4$ hydrocarbons and lighter constituents showed the following composition:

| | Per cent |
|---|---|
| Carbon disulfide | 9.0 |
| Thiophene | 80.5 |
| Residue (mostly thiophene) | 10.5 |

Thiophene tar, such as the tar obtained according to the above described procedure, was found to have the following characteristics:

| | |
|---|---|
| Average weight per cent sulfur | 56.7 |
| Average molecular weight | 281 |
| Specific gravity 85° F./65° F. | 1.460 |
| Weight per cent insoluble in benzene | 7.5 |
| Weight per cent free sulfur | 0.09 |
| Weight per cent sulfur as SH | nil |
| Viscosity (S. U. V. at 210° F.) | 46 |

Five hundred parts by weight of such thiophene tar were vacuum-distilled in a distillation vessel immersed in a heating bath. While warming the tar, a stream of nitrogen was bubbled through the liquid until the tar was de-gassed. A scrubbing tower for removal of hydrogen sulfide and a dry ice-acetone condenser for removal of light liquids were connected in series before the vacuum pump. The bath temperature was allowed to rise slowly and then was maintained at 175–200° C. A pressure of 1 millimeter of mercury was initially obtained but this gradually rose upon prolonged heating of the tar until a maximum pressure of 10 millimeters of mercury was reached. The product consisted of 226 parts by weight of a red oil distillate boiling between 100° C. and 170° C. The yield of said distillate, based on the weight of tar, was 45.3 per cent.

The red oil distillate was analyzed and found to contain the following:

| | |
|---|---|
| Weight per cent sulfur | 56.8 |
| Weight per cent carbon | 39.8 |
| Weight per cent hydrogen | 3.4 |
| Molecular weight | 191 |
| Density 60°F./60 | 1.358 |

The red oil was then vacuum-fractionated at a pressure of 4 millimeters of mercury, whereupon the following fractions were obtained:

| Fraction | B. Pt. Range, °C. at 760 mm. | Weight Per Cent | Weight Per Cent S | N. N. | Mol. Wt. |
|---|---|---|---|---|---|
| 1 | 164°–190° | 25.0 | 54.7 | 428 | 118 |
| 2 | 190°–260° | 11.4 | | 255 | |
| 3 | 260°–290° | 4.7 | 56.3 | 46.2 | 145 |

Fraction Two is an intermediate cut containing at least 50 per cent of fraction boiling between 164°–190° which accounts for the high neutralization number.

Fraction One was identified as thiophenethiol from the following data:

| | Product Boiling Between 164°–190° C. at 760 mm. | Theoretical Thiophenethiol |
|---|---|---|
| Molecular Weight | 118 | 116 |
| Per Cent Sulfur | 54.7 | 55.2 |
| Per Cent Carbon | 42.0 | 41.3 |
| Per Cent Hydrogen | 3.3 | 3.4 |
| Per Cent Sulfur as SH | 28.0 | 27.6 |
| Empirical Formula | $C_4H_4S_2$ | $C_4H_4S_2$ |
| Derivatives of Compound: | | |
| Sulfur Content of Hg salt (M. P. 148°–149° C.) Per Cent | 29.6 | 29.7 |
| Sulfur Content of 2,4-Dinitrophenyl thienyl thio ether Per Cent | 22.4 | 22.7 |

Infra-red spectrum analysis of this low boiling vacuum distillate indicated the presence of the thiophene nucleus and SH group.

The yield of thiophenethiol was 11.3 per cent by weight, based on the original tar.

It is evident that thiophenethiol does not exist as such in the original tar but is formed by the decomposition of sulfur-containing compounds during the distillation process, since no appreciable amounts of mercaptan (SH) groups have been detected in the original tar. Moreover, thiophenethiol is steam volatile; yet normal steam distillation of the tar results in little carry-over of products. Also, distillation of the tar under reduced pressure indicates very little material boiling below 80° C., while on redistillation of the initial distillate at a pressure of 4 millimeters more than 50 per cent of the material boils below 50° C. This is an indication of super-heating during the destructive distillation process period.

The thiophenethiol obtained by the above described process is useful as a mineral oil additive, in the manufacture of insecticides and pharmaceutical compounds, in the compounding of rubber, as a flotation agent and as an intermediate in organic synthesis.

I claim:

1. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is below that favoring complete sulfurization of the hydrocarbon to carbon disulfide, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, vacuum-distilling said tar at a pressure below about 10 millimeters of mercury and a temperature between about 150° C. and about 250° C., redistilling the resulting initial distillate under reduced pressure at a temperature corresponding to that within the range of 164–190° C. at atmospheric pressure and collecting the resulting distillate.

2. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is below that favoring complete sulfurization of the hydrocarbon to carbon disulfide, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, vacuum-distilling said tar at a pressure below 10 millimeters of mercury and a temperature between about 150° C. and about 250° C., redistilling the resulting initial distillate at a pressure below 10 millimeters of mercury and recovering the distillate having a boiling point within the range corresponding to 164–190° C. at atmospheric pressure.

3. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is below that favoring complete sulfurization of the hydrocarbon to carbon disulfide, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, vacuum-distilling said tar at a pressure below 2 millimeters of mercury and a temperature between about 175° C. and about 190° C., redistilling the resulting initial distillate at a pressure below 10 millimeters of mercury and recovering the distillate having a boiling point within the range corresponding to 164–190° C. at atmospheric pressure.

4. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is between about 0.5 and about 4, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, vacuum-distilling said tar at a pressure below 10 millimeters of mercury and a temperature between about 150° C. and about 250° C., redistilling the resulting initial distillate at a pressure below 10 millimeters of mercury and recovering a fraction from said distillation having a boiling point of from 164° C. to 190° C. at atmospheric pressure.

5. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is between about 0.5 and about 4, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, vacuum-distilling said tar at a pressure below 10 millimeters of mercury at a temperature between 150° C. and 250° C., redistilling the resulting initial distillate at a pressure of about 2 millimeters of mercury and recovering a fraction having a boiling point of from about 45° C. to about 50° C. at said pressure.

6. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated sulfur and the preheated hydrocarbon in a proportion wherein the weight ratio of sulfur to hydrocarbon is between about 0.5 and about 4, reacting said preheated sulfur with said preheated hydrocarbon at a reaction temperature varying between 450° C. and about 760° C. to yield a mixture containing a tar, immediately reducing the temperature of the mixture containing said tar to a temperature of less than 450° C., separating the tar from said mixture, distilling said tar in the presence of an inert gas at a pressure of less than 10 millimeters of mercury and a temperature between about 150° C. and about 250° C., redistilling the resulting initial distillate at a pressure below 10 millimeters of mercury and recovering a fraction from said distillation having a boiling point of from 164° C. to 190° C. at atmospheric pressure.

7. A method of making thiophenethiol, comprising separately preheating sulfur and a $C_4$ hydrocarbon selected from the group consisting of normal butane, normal butenes, and butadienes to temperatures such that combining said sulfur and said hydrocarbon will give a reaction mixture having a temperature between about 450° C. and about 760° C., mixing the preheated hydrocarbon in a proportion wherein the weight ratio of sulfur to hydrocarbon is below that favoring complete sulfurization of the hydrocarbon to carbon disulfide, reacting said preheated sulfur with said preheated hydrocarbon at a reaction temperature varying between 450° C. and 760° C., to yield a mixture containing a tar, immediately reducing the temperature of the mixture containing said tar to a temperature of less than 450° C., separating the tar from said mixture, vacuum-distilling said tar at a temperature above about 150° C., but below about 250° C., redistilling the resulting initial distillate under reduced pressure at a temperature corresponding to that within the range 164-190° C. at atmospheric pressure and collecting the resulting distillate.

SIGMUND J. LUKASIEWICZ.

REFERENCES CITED

The following references are of record in the file of this patent:

UNITED STATES PATENTS

| Number | Name | Date |
|---|---|---|
| 2,428,727 | Thacker | Oct. 7, 1947 |